(12) United States Patent
Nakajima

(10) Patent No.: US 7,095,456 B2
(45) Date of Patent: Aug. 22, 2006

(54) FIELD EXTENSIBLE CONTROLLEE SOURCED UNIVERSAL REMOTE CONTROL METHOD AND APPARATUS

(75) Inventor: Satoshi Nakajima, Redmond, WA (US)

(73) Assignee: UI Evolution, Inc., Bellevue, WA (US)

(*) Notice: Subject to any disclaimer, the term of this patent is extended or adjusted under 35 U.S.C. 154(b) by 190 days.

(21) Appl. No.: 10/006,451

(22) Filed: Nov. 21, 2001

(65) Prior Publication Data

US 2003/0095211 A1    May 22, 2003

(51) Int. Cl.
*H04N 5/44* (2006.01)
(52) U.S. Cl. ..................................... 348/734
(58) Field of Classification Search ............... 348/734, 348/725; 340/825.69, 825.72, 825.25; 345/169, 345/335; 725/141, 37–40, 48–50, 51–52, 725/56–57, 59, 61
See application file for complete search history.

(56) References Cited

U.S. PATENT DOCUMENTS

| | | | |
|---|---|---|---|
| 5,228,077 A | | 7/1993 | Darbee |
| 5,537,106 A * | | 7/1996 | Mitsuhashi ............ 340/825.72 |
| 5,850,340 A * | | 12/1998 | York ............................ 700/83 |
| 6,104,334 A * | | 8/2000 | Allport ......................... 341/175 |
| 6,127,941 A * | | 10/2000 | Van Ryzin ............. 340/825.69 |
| 6,160,491 A * | | 12/2000 | Kitao et al. ............. 340/825.69 |
| 6,278,499 B1 * | | 8/2001 | Darbee et al. ............... 348/734 |
| 6,292,186 B1 * | | 9/2001 | Lehman et al. ............. 345/335 |
| 6,346,934 B1 * | | 2/2002 | Wugofski .................... 345/158 |
| 6,407,779 B1 * | | 6/2002 | Herz ............................ 348/734 |
| 6,426,705 B1 * | | 7/2002 | Wischoeffer ............ 340/825.69 |
| 6,437,836 B1 * | | 8/2002 | Huang et al. ................ 348/734 |
| 6,463,586 B1 * | | 10/2002 | Jerging .......................... 725/37 |
| 6,469,633 B1 * | | 10/2002 | Wachter ................ 340/825.69 |
| 6,496,122 B1 * | | 12/2002 | Sampsell ............... 340/825.69 |
| 6,532,592 B1 * | | 3/2003 | Shintani et al. ............. 725/141 |
| 6,603,488 B1 * | | 8/2003 | Humpleman et al. ....... 715/771 |

OTHER PUBLICATIONS

Daniel Tonks, Philips ProntoPro TSU6000 Remote Control Review, Sep. 26, 2001, web pages.
http://www.remotecentral.com/prontopro/index.html http://www.remotecentral.com/prontopro/index2.htm.
http://www.remotecentral.com/prontopro/index5.htm http://www.remotecentral.com/prontopro/index6.htm.
http://www.remotecentral.com/prontopro/index7.htm http://www.remotecentral.com/prontopro/index8.htm.
http://www.remotecentral.com/prontopro/index9.htm http://www.remotecentral.com/prontopro/index10.htm.
http://www.remotecentral.com/prontopro/index11.htm http://www.remotecentral.com/prontopro/index12.htm.

(Continued)

*Primary Examiner*—Paulos M. Natnael
(74) *Attorney, Agent, or Firm*—Schwabe, Williamson & Wyatt, P.C.

(57) ABSTRACT

A remote control device receives the user interface displays for controlling a primary controllee electronic device from the primary controllee device itself. The remote control device may also receive the user interface displays for controlling an auxiliary controllee electronic device from the primary controllee electronic device, which in one embodiment, generates the user interface displays in response to specifications received from the auxiliary controllee electronic display. A user controls the controlee devices using the user interfaces provided to the remote control device. In response, control commands are provided to the primary controllee electronic device, including commands for the auxiliary controllee device(s). The primary controllee device relays the commands to the auxiliary controllee device(s). Alternatively, commands for the auxiliary controllee devices may be provided to the auxiliary controllee devices directly.

49 Claims, 10 Drawing Sheets

OTHER PUBLICATIONS http://www.remotecentral.com/prontopro/index13.htm http://www.remotecentral.com/prontopro/index14.htm.

http://www.remotecentral.com/prontopro/index15.htm http://www.remotecentral.com/prontopro/index16.htm.

http://www.remotecentral.com/prontopro/index17.htm http://www.remotecentral.com/prontopro/index18.htm.

http://www.remotecentral.com/prontopro/features.htm http://www.remotecentral.com/protonpro/specs.htm.

http://www.remotecentral.com/prontopro/press.htm.

* cited by examiner

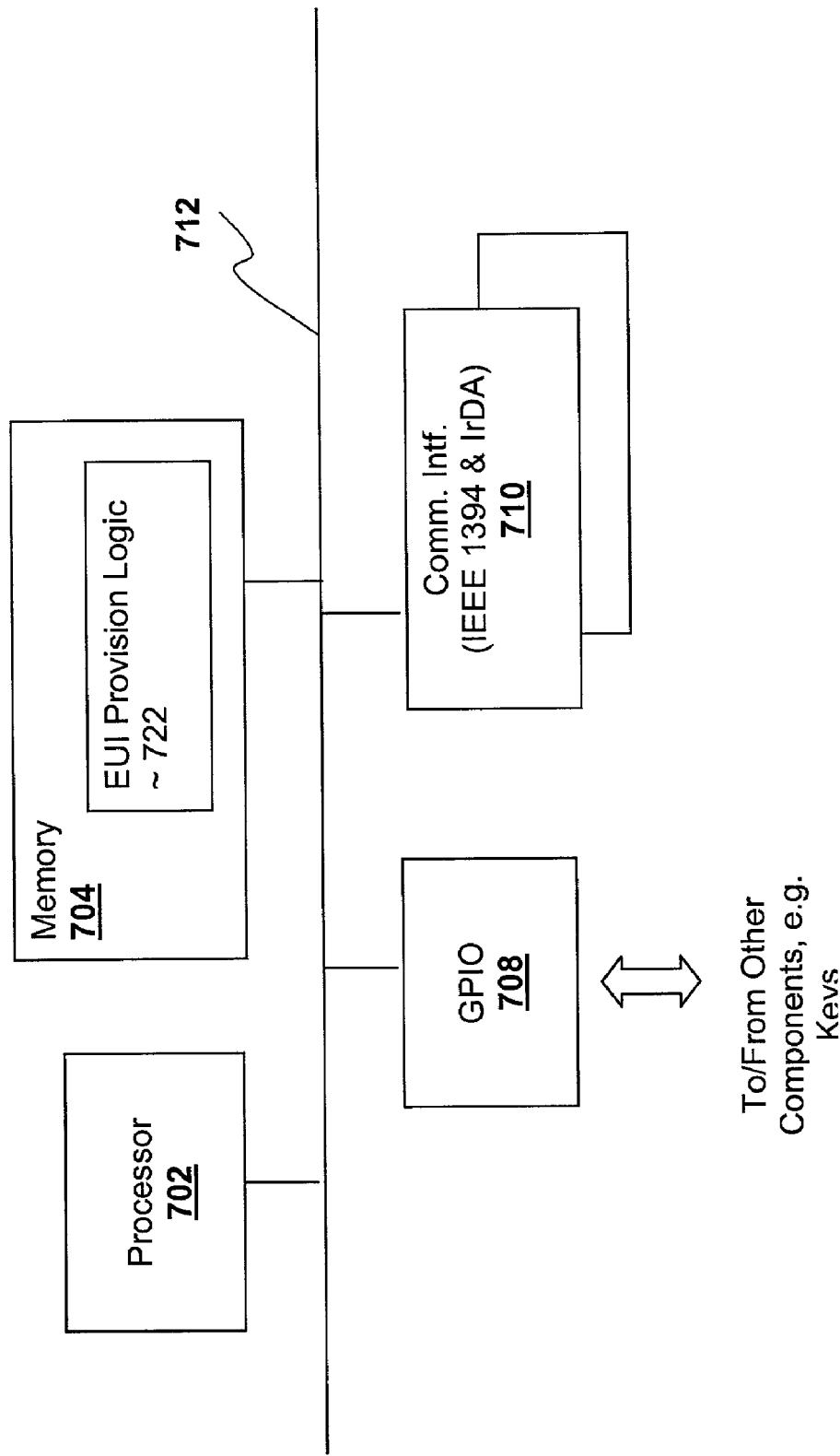

FIGURE 8

```
<Display State S1> ~ 802a
    <Display Cell C1> ~ 804a
    ....
    </End Display Cell C1>
    <Display Cell C2> ~ 804b
    ....
    </End Display Cell C2>

<Transition R1> Display State x </End Transition R1>  ~ 806a
<Transition R2> Display State y </End Transition R2>  ~ 806b </End Display State S1>
<Display State S1> ~ 802b
    <Display Cell C1> ~ 804a
    ....
    </End Display Cell C1>
    <Display Cell C2> ~ 804c
    ....
    </End Display Cell C2>

<Transition R3> Display State x </End Transition R3>  ~ 806c
<Transition R4> Display State z </End Transition R4>  ~ 806d </End Display State S1>
```

FIELD EXTENSIBLE CONTROLLEE SOURCED UNIVERSAL REMOTE CONTROL METHOD AND APPARATUS

FIELD OF INVENTION

The present invention relates to the field of remotely controlling electronic devices. More specifically, the present invention relates to a field extensible, controllee sourced universal remote control method and apparatus for remotely controlling electronic devices, such as television (TV), set-top box, video cassette recorder (VCR), digital versatile disk (DVD) player, and so forth.

BACKGROUND OF THE INVENTION

Advances in technology, in particular in the entertainment field, have increased the number of electronic devices within a typical household. For example, an increasing number of households have sophisticated entertainment systems that may include various electronic devices such as a television, a cable set-top box, a VCR, a DVD player, home theatre audio devices, and so forth. Commonly, a separate and distinct remote control is provided for controlling each of these electronic devices, resulting in a user having to juggle several remote controls.

In order to alleviate the problem of having to deal with multiple remote controls, a universal remote control (universal remote) is often used. A universal remote is a remote control device equipped with the control codes of multiple electronic devices known at the time of design and manufacturing of the universal remote.

However, universal remote controls suffer from a number of disadvantages. First of all, because the plethora of electronic devices available to an average consumer are made by many different manufacturers, and most manufacturers employ proprietary control commands to control their electronic devices, as result, universal remotes are typically equipped to handle a large set of control codes. Accordingly, a user typically has to program into the universal remote a particular device code for each electronic device to be controlled, to identify the manufacturer of the electronic device, and therefore the control codes to be used to control the electronic device, before the universe remote can be used. Thus, many users find universal remote controls less than desirable.

Further, the number of electronic devices supported by a universal remote is limited to the electronic devices known to the manufacturer of the universal remote (or elected to support by the manufacturer) at the time the universal remote is made. New models of devices or new devices employing new control commands not known or programmed into the universal remote at the time the universal remote is manufactured are not supported by the universal remote. This shortcoming adds to the less than desirable user experience of universe remotes, especially for the leading edge consumers who readily adopt new models of electronic devices or new electronic devices.

Thus, an improved method for controlling electronic devices is desired.

BRIEF DESCRIPTION OF DRAWINGS

The invention is illustrated by way of example and not by way of limitation in the figures of the accompanying drawings, in which the like references indicate similar elements and in which:

FIGS. 5–7 illustrate one each, an internal component view of a remote control, a primary controllee electronic device, and an auxiliary controllee electronic device, in accordance with one embodiment of the invention; and FIG. 8 illustrates an XML like specification approach suitable for use to practice the end user interface specification aspect of the present invention, in accordance with one embodiment.

DETAILED DESCRIPTION OF THE INVENTION

Figure 1:
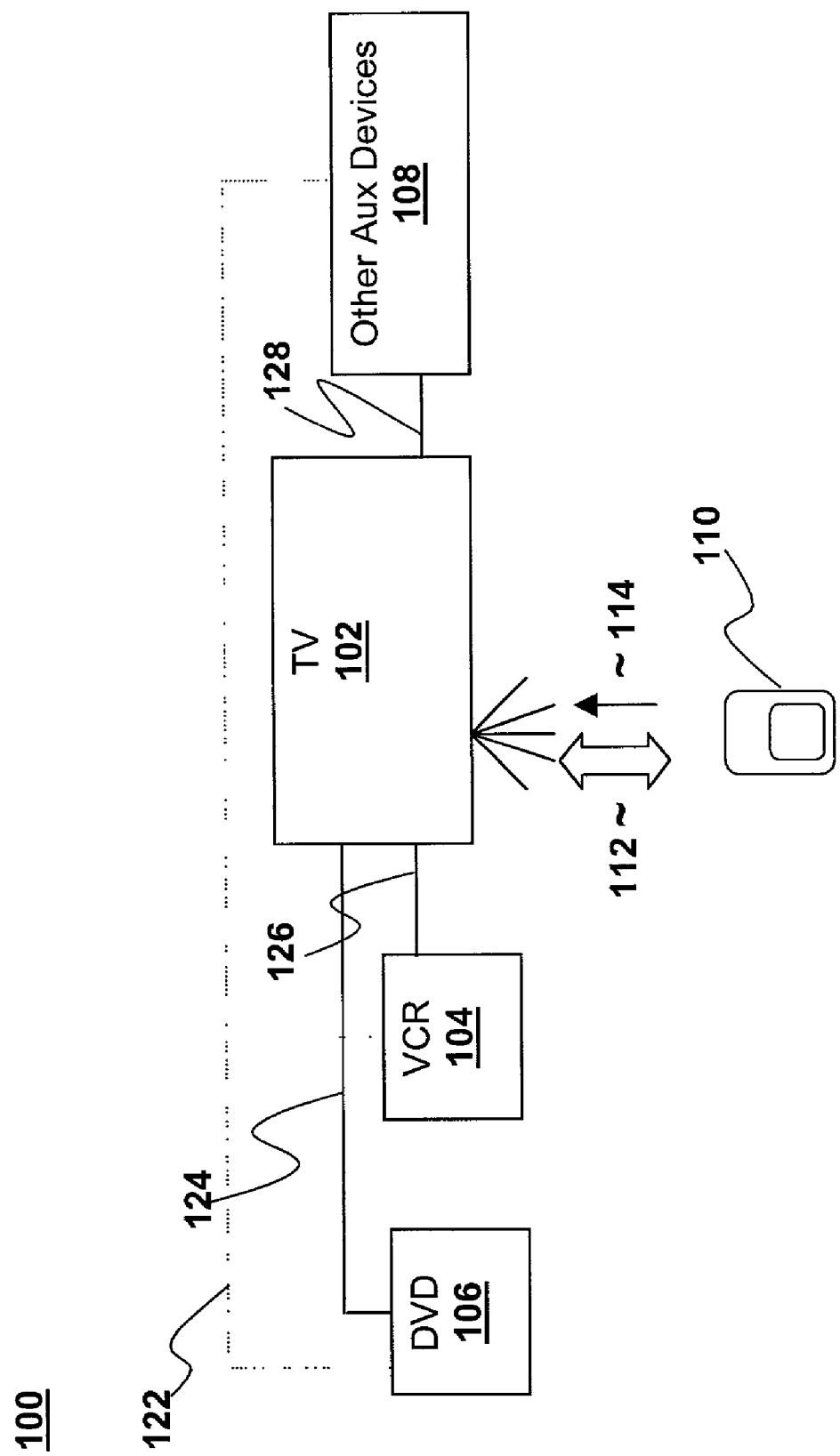
FIG. 1 illustrates an overview of the invention, in accordance with one embodiment.

The present invention includes a field extensible, controllee sourced universal remote control method and apparatus for remotely controlling electronic devices, such as TV, VCR, DVD players, and other electronic devices of the like. The present invention advantageously enables a basic generic remote control to be progressively enhanced, and field extended to function as a universal remote for a number of electronic devices incorporated with the teachings of the present invention, even if the electronic devices are new models or new devices introduced after the design and manufacturing of the basic generic remote control, thereby improving a user's remote control experience.

In the following description, for ease of understanding, various aspects of the invention will be described with a TV as the primary controllee electronic device. However, it will be apparent to those skilled in the art that the invention may be practiced with only some or all aspect of the invention, and with other electronic devices, such as a cable set-top box as the primary controllee electronic device. For purposes of explanation, specific numbers, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Parts of the invention will be presented using terms such as user interfaces, buttons, and so forth, commonly employed by those skilled in the art to convey the substance of their work to others skilled in the art. The term "controllee electronic device" refers the object electronic devices controlled by the universal remote. Parts of the description will be presented in terms of operations performed by a computing device, using terms such as clicking, determining, rendering, and so forth. As well understood by those skilled in the art, these quantities and operations take the form of electrical, magnetic, or optical signals capable of being stored, transferred, combined, and otherwise manipulated through mechanical, electrical and/or optical components of a computer system. The term computer system includes general purpose as well as special purpose computing machines, systems, and the like, that are standalone, adjunct or embedded.

Various operations will be described as multiple discrete steps in turn, in a manner that is most helpful in understanding the invention. However, the order of description should not be construed as to imply that these operations are necessarily order dependent. In particular, these operations need not be performed in the order of presentation.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

Overview

FIG. 1 illustrates an overview of the invention, in accordance with one embodiment. Shown in FIG. 1 is an exemplary entertainment system 100 including a primary controllee electronic device, TV 102, various auxiliary controllee electronic devices 104–108 (hereinafter, simply auxiliary devices) coupled to TV 102, and a new type of universal remote control 110 of the present invention, that is field extensible. TV 102 and auxiliary devices 104–108 are incorporated with the teachings of the present invention, i.e. advantageously providing field extensible universal remote 110 with the control end user interface displays to control TV 102 and auxiliary devices 104–108, to enable field extensible universal remote 110 to function as a universal remote, and be used by a user to remotely control TV 102 as well as its auxiliary devices 104–108.

As will be described in more details below, the control end user interface displays for controlling auxiliary devices 104–108 are advantageously provided to field extensible universal remote 110 through TV 102. That is, the control end user interface displays for controlling auxiliary devices 104–108, more specifically, for the embodiment, the specifications of their substantive contents, are first provided to TV 102, which in turn generates the control end user interface displays, and provides them to field extensible universal remote 110.

As illustrated, auxiliary devices 104–108 may include VCR 104, DVD player 104, as well as other auxiliary device 108 of like kind. Auxiliary device 108 of like kind may include cable set-top box, home theatre audio control unit, video camera and so forth. While for ease of understanding, entertainment system 100 is shown to include only TV 102 and three other electronic devices 104–108, as will be readily apparent from the description to follow, the present invention may be practiced with entertainment system 100 having any number of electronic devices, of any type, properly incorporated with the teachings of the present invention, including but not limited to, electronic devices such as lighting controls, heating ventilation air-conditioning (HVAC) controls, and so forth.

For the embodiment, auxiliary devices 104–108 are correspondingly coupled to TV 102 through cablings 124–128 as well as through "medium" 122. Cablings 124–128 represent convention cabling between auxiliary devices 104–108 and TV 102. Medium 122 represents a number of wireless as well as wire based medium known in the art. In one embodiment, medium 122 represents an Infrared Data Association (IrDA) standard based optical connection. In another embodiment, medium 122 represents a Bluetooth or IEEE 802.11 based electromagnetic wireless connection. In yet another embodiment, medium 122 represents a serial, a parallel, a Universal Serial Bus (USB) or an IEEE 1394 high performance serial bus based electrical connection.

Field extensible universal remote 110 and TV 102 are shown to be coupled to each other in a preferred arrangement, through an IEEE 802.11 based wireless communication connection 112 (for provisioning the control end user interfaces), and an IrDA standard based wireless optical connection 114 (for transmitting control commands to the controllee electronic devices 102–108). However, as with medium 122 coupling TV 102 to other auxiliary devices 104–108, field extensible universal remote 110 and TV 102 may be coupled to each other via other wireless or wired, optical, electro-magnetic or electrical connections.

In each of these embodiments, a corresponding appropriate communication protocol, i.e. a wireless or wire based, optical, electromagnetic or electrical communication protocol is employed to facilitate communication between auxiliary devices 104–108 and TV 102, in particular, the provision of the earlier described specifications of the substantive contents of control end user interface displays for controlling auxiliary devices 104–108 to TV 102.

As will be described in more detail below, in certain embodiments, the corresponding communication protocol is also employed to facilitate relaying of the corresponding control commands from TV 102 to auxiliary devices 104–108.

In selected embodiments, when the auxiliary device is an electronic device that provides video signals to TV 102, such as VCR 104 or DVD 106, the auxiliary device may be coupled to TV 102 only through conventional cabling 124 or 126, without employing the additional "data" coupling of "medium" 122. In these embodiments, the specifications for the control end user interface displays may be provided employing a message based communication protocol embedded in a video protocol. For example, the specifications for the substantive contents of the control end user interface displays may be transmitted in accordance with a predetermined message protocol embedded in the vertical blank intervals of the video signals transmitted in accordance with the NTSC, PAL or SECAM standard.

Methods

Figure 2:
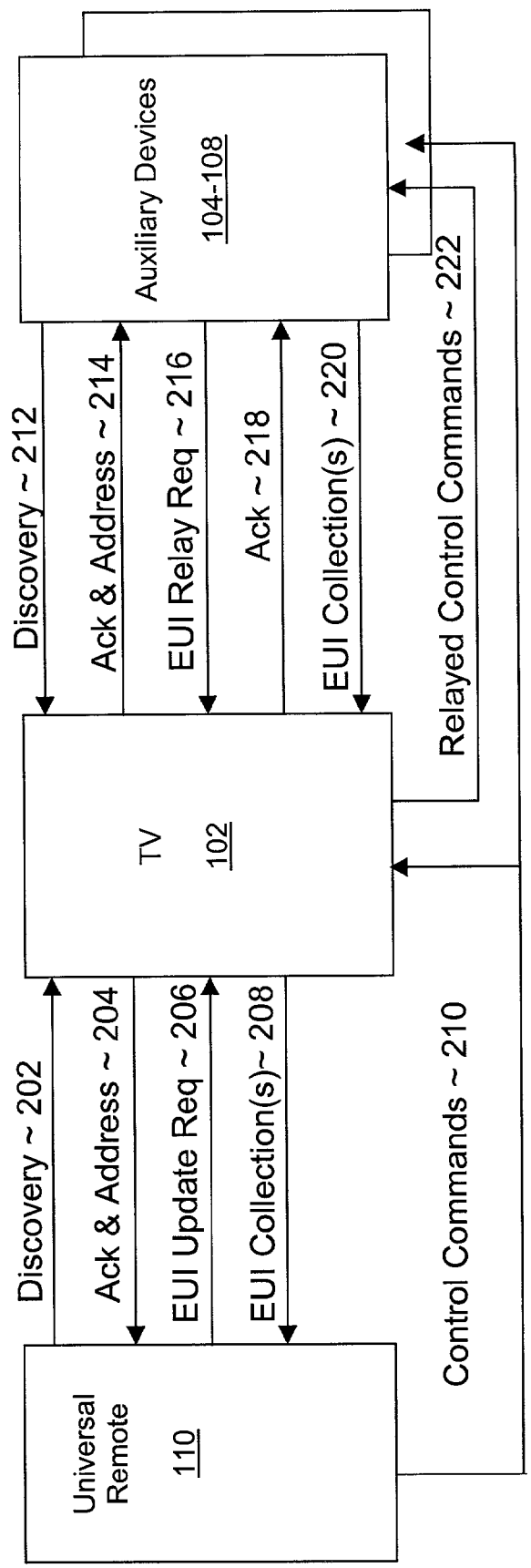
FIG. 2 illustrates methods of the invention in further details, in accordance with one embodiment.

FIG. 2 illustrates the field extensible controllee sourced universal remote control methods of the present invention in further details, in accordance with one embodiment. As illustrated, when a field extensible universal remote 110 is first introduced to control an entertainment system 100 (or re-introduced after losing all or part of the controllee sourced control end user interface for controlling the electronic devices, due to power lost or other reasons), field extensible universal remote 110 broadcast discovery messages 202 to locate a proximately located primary controllee electronic device (for the embodiment, that is TV 102). The broadcast may be triggered through explicit user control (e.g. in response to the user's selection of a particular control key or a pre-determined selection pattern of one or more control keys of universal remote 110). The broadcast may be made in accordance with any one of a number of discovery protocols known in the art, e.g. targeting a predetermined port a primary controllee electronic device would be listening.

As illustrated, upon "hearing" the discovery broadcast, a primary controllee device such as TV 102 responds by acknowledging the broadcast, 204, and for the embodiment, assigns a network address to universal remote 110. In alternate embodiment, a device identifier may be assigned and used instead.

Subsequently, at a later point in time (during an initialization/re-initialization process or when a new auxiliary device is introduced), field extensible universal remote 110 issues a request 206 to update its collection of control end user interfaces. In one embodiment, the request includes an enumeration of the control end user interfaces that are already in possession by field extensible universal remote 110, and their corresponding versions, thus allowing TV 102 to merely responds with only the missing or replacement versions of the applicable control end user interfaces. During initialization or re-initialization, the enumeration would be "empty". Similarly, the request may be triggered through explicit user control (e.g. in response to the user's selection of a particular control key or a predetermined selection pattern of one or more control keys of universal remote 110). In one embodiment, the request is transmitted in pre-determined message format known to TV 102.

Upon receipt of the request, as alluded to earlier, TV 102 determines the amount of upgrades needed, based on the enumerated control end user interfaces that are already in possession by the field extensible universal control 110, and responds with the missing or newer versions of the control end user interfaces 208 for controlling itself and the coupled auxiliary devices 104–108.

Thereafter, having been provided with the proper control end user interfaces, a user may interact with the provided interface to cause control commands 210 to be issued to control TV 102 and the coupled auxiliary devices 104–108. In one embodiment, control commands 210 are directly provided to each of the controlled devices, TV 102 and auxiliary devices 104–108, through e.g. the earlier described IrDA standard based optical connection. In alternate embodiments, control commands 210 are accepted by TV 102, and either responded to by TV 102 if they are directed to TV 102, or routed to the appropriate coupled auxiliary devices 104–108 (commands 222). For these embodiments, it would not be necessary for the auxiliary devices 104–108 to be equipped to accept commands in the medium over which field extensible universal remote 110 transmits the control commands, as the control commands may be relayed back to the auxiliary device through the same medium the auxiliary device provides its control end user interface specification to TV 102. Therefore, only TV 102, i.e. the primary controllee electronic device, needs to be so equipped.

Over on the "other" side, between TV 102 and an auxiliary device, e.g. one of devices 104–108, in like manner, when the auxiliary device is first introduced in the operating environment, at an appropriate point in time during initialization, the auxiliary device would broadcast a discovery message 212 to locate a proximately located primary controllee electronic device.

For the embodiment, in like manner, upon "hearing" the discovery broadcast, TV 102 acknowledges the broadcast 214, and assigns a network address 214 to the "new" auxiliary device. Similarly, in alternate embodiments, a device identifier may be assigned and used in lieu of network addresses.

Upon having been assigned a network address, for the embodiment, the "new" auxiliary device requests TV 102, 216, to "relay" its control end user interface to field extensible universal remote 110. In one embodiment, as will be described in more detail below, a control end user interface is constituted in a form having a number of display states, display cells and display state transition rules. Further, a "new" auxiliary device is merely required to provide TV 102 with specifications specifying the substantive contents of the control end user interface. In response, TV 102 would generate the executable code for the control end user interface. Further, in various embodiments, the specifications are advantageously expressed, employing an XML like specification language (as shown in FIG. 8). XML is known in the art. Thus, this XML like approach to specifying the substantive contents of a control end user interface is well within the ability of one skilled in the art, accordingly will not be further described.

Still referring to FIG. 2, in response to the "relay" request, TV 102 acknowledges the request 218, instructing the "new" auxiliary device to specify its control end user interface. Upon receiving the approval to provide the specification, the "new" auxiliary device provides TV 102 with specifications 220, specifying the substantive contents of the control end user interface for controlling the "new" auxiliary device.

In one embodiment, the exchanges between TV 102 and the "new" auxiliary device also include specifying whether TV 102 is to listen to and relay control commands targeted for the "new" auxiliary device, to the "new" auxiliary device. If so, in addition to updating field extensible universal remote 110 with the control end user interface to control the "new" auxiliary device, the next time remote 110 requests for an update to its control end user interface collections, TV 102 further adds the "new" auxiliary device to the list of auxiliary devices on whose behalf it is to listen and relay control commands targeted for the respective auxiliary devices.

Field Extensible Universal Remote and Control End User Interface

Figure 3A:
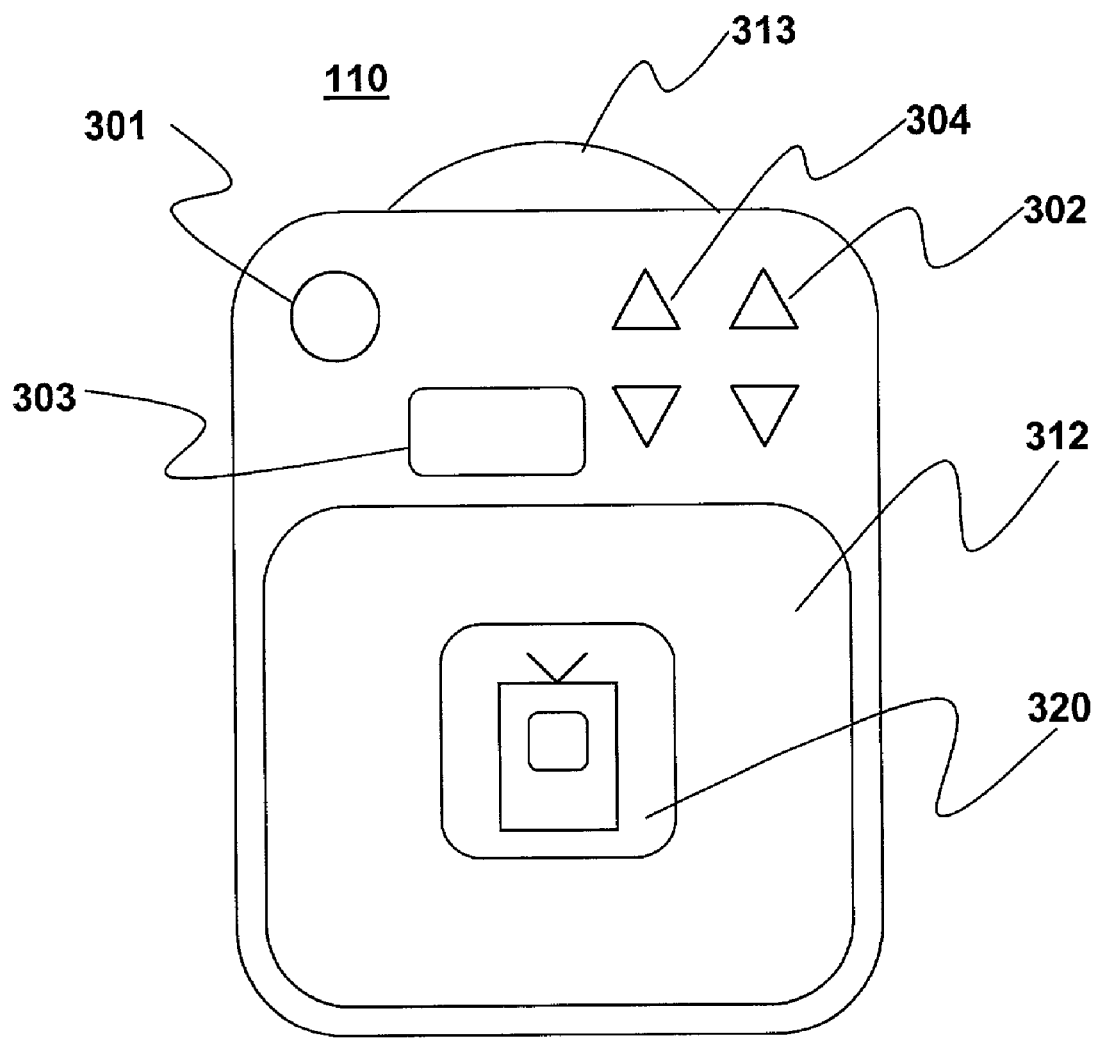
FIGS. 3a–3c illustrate a perspective view of an exemplary field extensible universal remote of the present invention, and exemplary display states of controllee sourced control end user interface displayed thereon, in accordance with one embodiment.
Figure 3B:
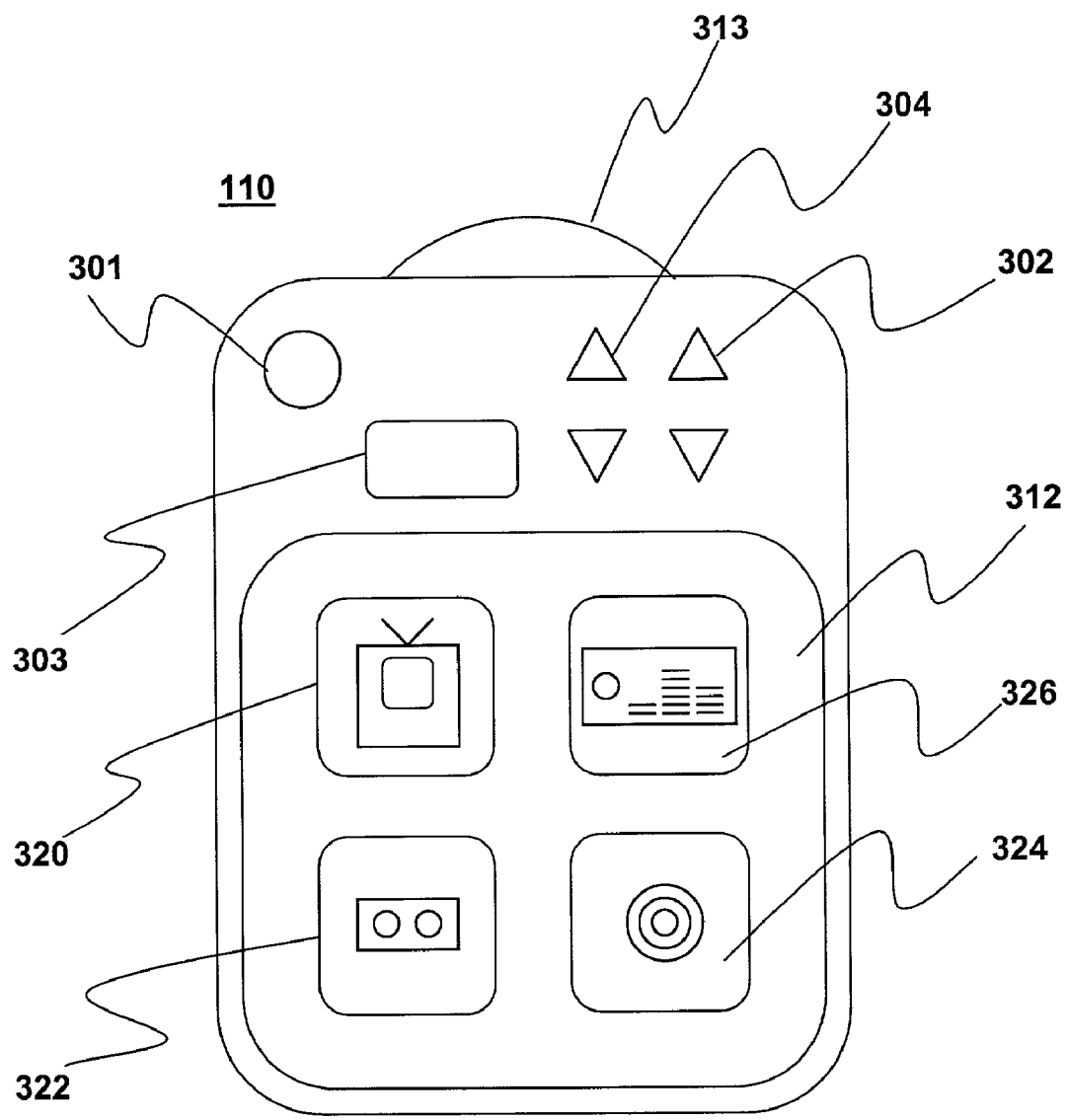
Figure 3C:
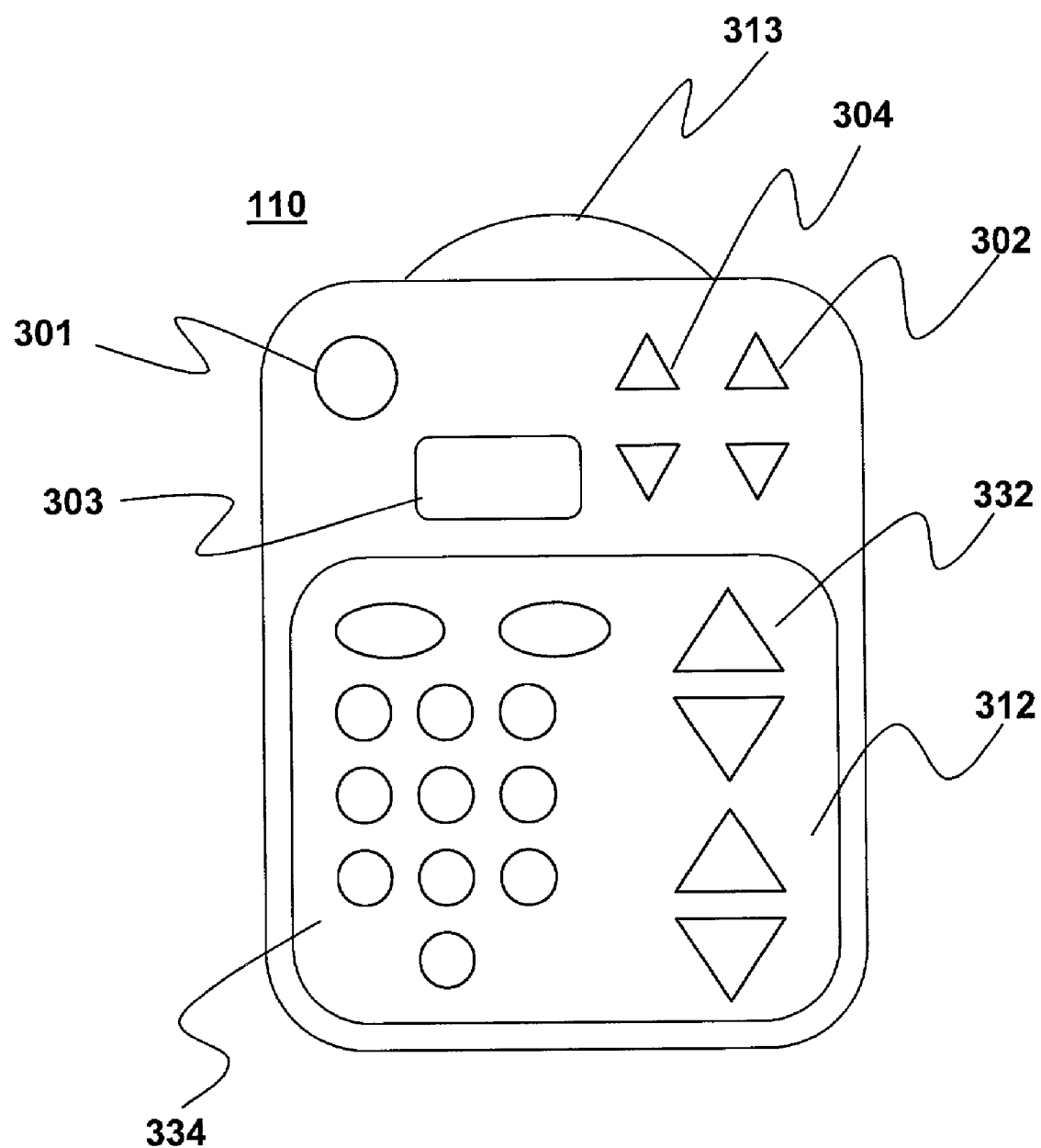

FIGS. 3a–3c illustrate a perspective view of a field extensible universal remote and various control end user interfaces rendered thereon, in accordance with one embodiment. Shown in FIG. 3a, is field extensible universal remote 110 having control buttons 301–304, wireless receiver/transmitter 313, and touch screen LCD 312. Control buttons 301–304 are employed to facilitate functions that are common to remote controls, including but not limited to power on/off, and the earlier described discovery broadcasts and update requests. Wireless receiver/transmitter 313 is employed to transmit and receive signals, including the earlier described broadcast and acknowledgement messages, as well as control commands. LCD 320 is employed to facilitate rendering of the provided control end user interface to enable a user to interact with the provided control end user interfaces to control TV 102 and auxiliary devices 104–108.

Illustrated in FIG. 3a is an exemplary initial display state of a control end user interface for controlling TV 102 rendered on touch screen LCD 312. For the embodiment, the initial display state is a graphical representation of TV 102. The graphical representation of a TV 102 coveys to a user (not shown) that it may interact with a series of control end user interfaces associated with the graphical representation to control TV 102. The subsequent displays are rendered based on the user interactions.

FIG. 3b illustrates another exemplary display state of the collections of user interface displays for controlling a number of electronic devices. The exemplary display state reflects that VCR 104, DVD 106 and home theatre audio control unit 108 have all provided their control end user interface specifications to TV 102, which in turn has generated the corresponding control end user interfaces, and provided the generated corresponding control end user interfaces to field extensible universal remote 110, in response to update requests from remote 110. The update requests may have been requested by a user of remote 110, when the user adds each of the corresponding electronic device to the entertainment environment.

As illustrated, the exemplary display state of the composite control end user interface includes graphic representations of each of the devices, TV 102, VCR 104, DVD 106 and home theatre audio control unit 108.

FIG. 3c illustrates yet another exemplary display state of the control end user interface in response to the user interacting with the initial display state. As shown, for the embodiment, once the user interacts with the initial display state (e.g. by selecting the graphical representation of TV 102 rendered on LCD 320 of field extensible universal remote 110), the next display state is displayed for the user on the touch screen LCD 112. For the exemplary control end user interface, the next display state includes graphical representations of various control buttons 332–334 for controlling the various operational characteristics of TV 102. These control buttons may include e.g. "buttons" for volume control, channel selection, menu display and forth. For example, one of the menu buttons may be a menu button for selecting a type of sound for TV 102 (i.e., stereo, mono, surround, theater, etc.). If the user presses the menu button for selecting type of sound to control, another control display for controlling sound type is rendered as the user interface. Control of other operating characteristics of TV 102 may also be facilitated in like manners. The operating characteristics may include but are not limited to picture brightness, picture contrast, picture colors, and so forth.

Similarly, control of operating conditions and/or characteristics of other auxiliary devices 104–108 may also be likewise facilitated. The operating characteristics may include but are not limited to play, stop, pause, fast forward, rewind, and so forth.

End User Interface Displays

Figure 4:
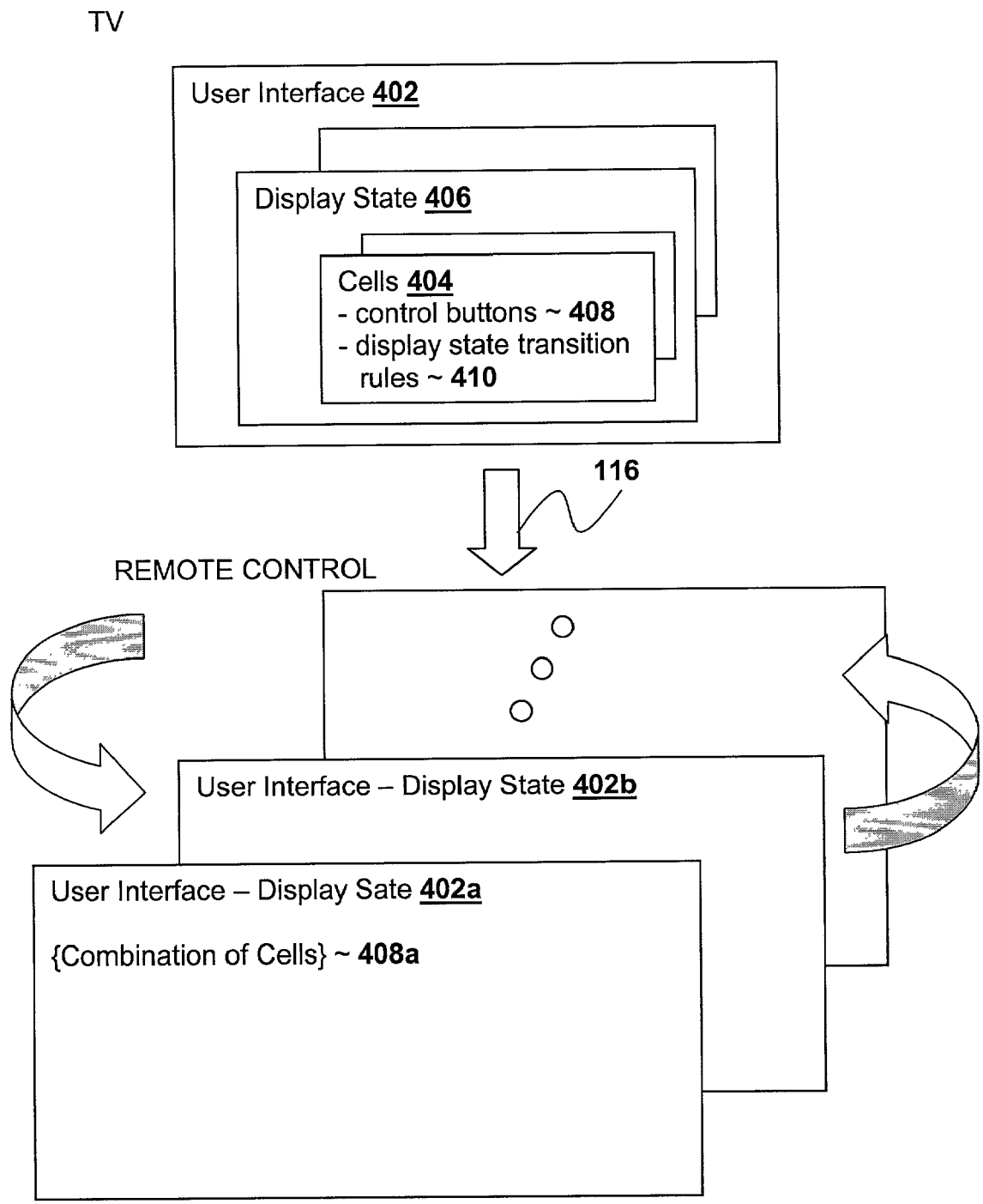
FIG. 4 illustrates an end user interface implementation technique suitable for use to practice the present invention, in accordance with one embodiment.

Referring now to FIG. 4, wherein a block diagram illustrating a manner in which the control end user interfaces for controlling TV 102 or one of the auxiliary devices 104–108 may be organized, and sent to field extensible universal remote 110, in accordance with one embodiment, is shown. As illustrated, an end user interface 402 for controlling TV 102 or one of the auxiliary devices 104–108 is provisioned from TV 102 to field extensible universal remote 110 in the form of a number of display state definitions 406, correspondingly defining instantiations of the control end user interface for various display states. Each instantiation of the control end user interface for a display state is constituted with a number of display cells 404. For the embodiment, the display cells 404 include elements of the control end user interface, such as titles, icons for user selections (e.g. the up and down arrows for volume control) and the associated control commands to be issued (e.g. volume up or volume down). A display cell including display elements, such as a title, or other persistently displayed elements, such as power on/off, and volume control, may be associated, and therefore displayed in multiple display states. Further, the display state definitions include display state transition rules 410, specifying conditions governing transitions between the defined display states (i.e. instantiations of the user interface) as a user interacts with the end user interface to control TV 102 and auxiliary devices 104–108. For example, the control end user interface is to be transitioned from the display state illustrated by FIG. 3b to the display state illustrated by FIG. 3c, when the graphic representation of TV 102 of the display state of FIG. 3b is selected by a user.

During operation, the current display state, and accordingly the current instantiation of the end user interface is locally determined by field extensible universal remote 110. Accordingly, after the transfer of display state definitions 206 (including display cells 208 and display state transition rules 210), except for instances where control commands are to be issued from field extensible universal remote 110 to TV 102 or one of auxiliary devices 104–108, minimal interactions or data transmissions are necessary between field extensible universal remote 110 and TV 102 or the other auxiliary devices 104–108.

Provisional of a locally controlled end user interface having display states, display cells and display state transition rules is the subject matter of co-pending U.S. Patent Application, entitled "Display State and/or Cell Based User Interface Provision Method and Apparatus", filed Sep. 14, 2000, having common inventorship with the present invention. The specification of which is hereby fully incorporated by reference.

Figure 5:
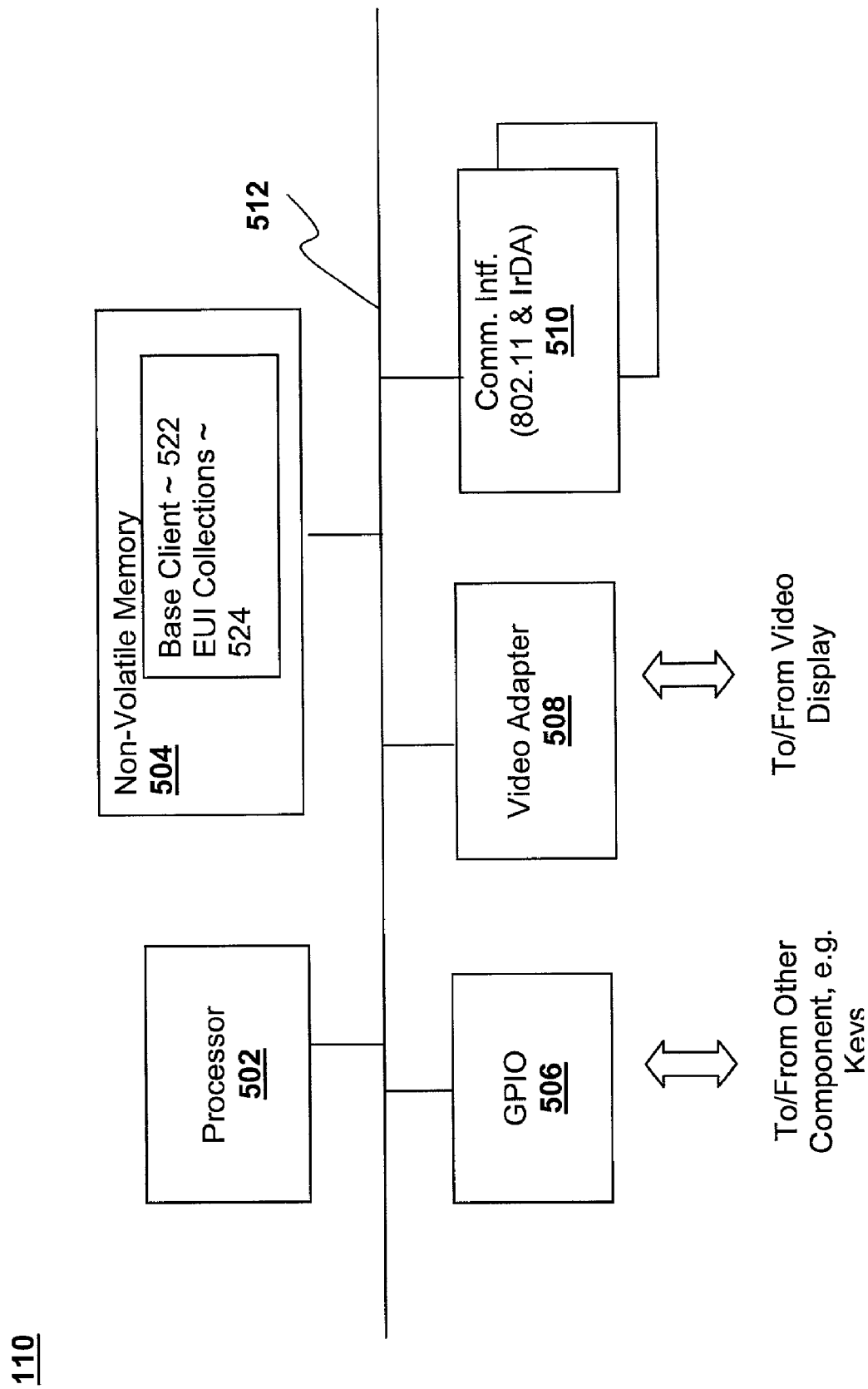

FIG. 5 illustrates an internal component view of the relevant elements of field extensible universal remote 110, in accordance with one embodiment. As shown, field extensible universal remote 110 includes processor 502 and non-volatile memory 504. The processing power of processor 502 and the size of non-volatile memory 504 may vary depending on the performance design point, i.e. the total complexity of the control end user interfaces of the controllee electronic devices supported. Obviously, high performance processor and large size memory are to be employed for higher performance design points, while lower performance processor and smaller size memory may be employed for lower performance design point.

Additionally, for the embodiment, field extensible universal remote 110 includes GPIO 506, video adapters 508 and communication interfaces 510. In particular, for the embodiment, communication interfaces 510 include an IEEE 802.11 based wireless communication interfaces for communicating with the primary controllee electronic device, TV 102, for the provisions of the control end user interfaces of the various controllee electronic devices TV 102 and auxiliary devices 104–108, and an IrDA standard based optical communication interface for directly transmitting the control commands to the controllee electronic devices. The elements are coupled to each other via system bus 514, which represents one or more buses. In the case of multiple buses, they are bridged by one or more bus bridges (not shown).

Each of these elements performs its conventional functions known in the art. In particular, non-volatile memory 504 is employed to store a copy of the programming instructions implementing the earlier described broadcast, request and command issuance functions of field extensible universal remote 110. In one embodiment, the programming instructions are C instructions, compiled for execution in a Palm OS execution environment having core execution services, such as memory allocations, interrupt and/or exceptions handling and so forth.

Primary Controllee Electronic Device (e.q TV 102)

Figure 6:
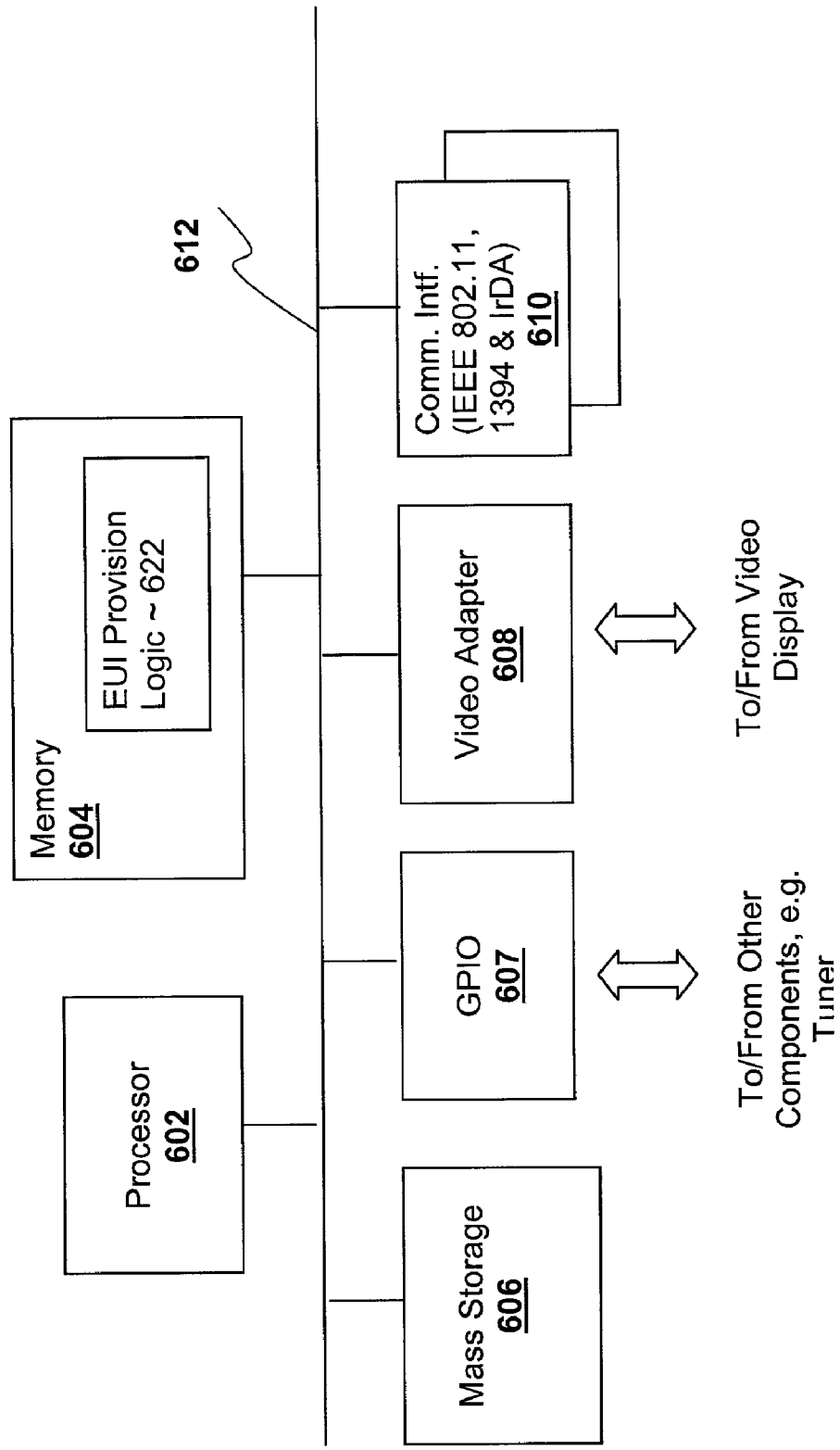

FIG. 6 illustrates an internal component view of the relevant elements of a primary controllee electronic device, such as TV 102, in accordance with one embodiment. As shown, the relevant elements of TV 102 include processor 602 and system memory 604. Similarly, the processing power of processor 602 and the size of system memory 604 may be vary depending on the performance design point, i.e. the number of auxiliary devices on whose behalf it can "relay" their control end user interfaces, and if applicable, control commands. Obviously, high performance processor and large size memory are to be employed for higher performance design points, while lower performance processor and smaller size memory may be employed for lower performance design points.

Additionally, TV 102 includes mass storage devices 606 (such as hard drive, CDROM and so forth), GPIO 607, video adapter 608 and communication interfaces 610 (such as serial, parallel, USB or IEEE 1394 based wired interfaces, Bluetooth/IEEE 802.11 based wireless interfaces, and/or IrDA standard based optical interfaces). The elements are coupled to each other via system bus 614, which represents one or more buses. In the case of multiple buses, they are bridged by one or more bus bridges (not shown).

Each of these elements performs its conventional functions known in the art. In particular, system memory 604 and mass storage 606 are employed to store a working copy and a permanent copy of the programming instructions implementing the earlier described functions of TV 102, i.e. acceptance of control end user interface specifications from auxiliary devices 104–108, generation of their control end user interfaces, and provisions of the generated control end user interfaces, as well as acceptance of control commands targeted for itself and relay of control commands targeted for applicable ones of auxiliary devices 104–108.

In one embodiment, the programming instructions are C instructions, compiled for execution in a Linux execution environment having core execution services, such as memory allocations, interrupt and/or exceptions handling and so forth.

Auxiliary Controllee Electronic Devices

FIG. 7 illustrates an internal component view of the relevant elements of an auxiliary control lee electronic device (such as VCR 104 or DVD 106), in accordance with one embodiment. As shown, auxiliary controllee electronic device 104/106/108 includes processor 702 and non-volatile memory 704. Again, the processing power of processor 702 and the size of non-volatile memory 704 may be vary depending on the performance design point, i.e. the complexity of the control end user interface. Obviously, high performance processor and large size memory are to be employed for higher performance design points, while lower performance processor and smaller size memory may be employed for lower performance design points.

Additionally, auxiliary controllee electronic device 104/106/108 includes includes GPIO 710, and communication interfaces 712 (such as serial, parallel, USB or IEEE 1394 based wired interfaces, Bluetooth/IEEE 802.11 based wireless interfaces, and/or IrDA standard based optical interfaces). The elements are coupled to each other via system bus 714, which represents one or more buses. In the case of multiple buses, they are bridged by one or more bus bridges (not shown).

Each of these elements performs its conventional functions known in the art. In particular, non-volatile memory 704 is employed to store a copy of the programming instructions implementing the earlier described control end user interface related functions of an auxiliary electronic device incorporated with the teachings of the present invention.

In one embodiment, the programming instructions are C instructions, compiled for execution in a Linux execution environment having core execution services, such as memory allocations, interrupt and/or exceptions handling and so forth.

ADVANTAGES

Thus, it can been from the above description, a universal remote equipped with the described relevant elements, may be progressive enhanced, and field extended, as a universal remote to control a plethora of controllee electronic devices, endowed with the teachings of the present invention, regardless of whether the controls for controlling the controllee electronic device are known at the time the universal remote is designed and manufactured.

As a result, a user of the field extensible universal remote of the present invention is substantially alleviated with the burden of identifying the controllee electronic device to the field extensible universal control. The complexity and burden of enabling the field extensible universal control to control with the various controllee electronic devices, including new versions or new devices are shifted to the designed and manufacturers of these devices.

Accordingly, a user may enjoy a much more user friendly experience in using the field extensible universal control of the present invention, to control electronic devices endowed with the teachings of the present invention.

CONCLUSION AND EPILOG

Thus, an improved field extensible, controllee sourced universal remote control method and apparatus has been described. As set forth earlier, those skilled in the art will recognize that the invention is not limited by the details described, instead, the invention can be practiced with modifications and alterations within the spirit and scope of the appended claims. The description is thus to be regarded as illustrative instead of restrictive on the invention.

What is claimed is:

1. A method comprising:
sending to a remote control, by a controllee electronic apparatus, a first collection of user interface displays having associated control commands, for the remote control to control the controllee electronic apparatus, the first collection of user interface displays having a plurality of display states and associated display state transition rules;
receiving by the controllee electronic apparatus, first control commands, from said remote control, the first control commands being resulted from said first collection of user interface displays being used by a user of said remote control; and
controlling operation of said controllee electronic apparatus, by said controllee electronic apparatus in accordance with said received first control commands.

2. The method of claim 1, wherein said sending to a remote control, by a controllee electronic apparatus, comprises sending to the remote control, by the controllee electronic apparatus a first collection of user interface displays having a plurality of display cells.

3. The method of claim 1, wherein said first control commands comprise control commands for controlling a plurality of operation characteristics of said controllee electronic apparatus, and said plurality of operation characteristics are selected from a group consisting of power on/off, channel selections, audio volume, picture brightness, and picture color.

4. The method of claim 1, wherein said method further comprises sending to said remote control, by the controllee electronic apparatus, a second collection of user interface displays for controlling an auxiliary controllee electronic device coupled to said controllee electronic apparatus.

5. The method of claim 4, wherein said sending to the remote control, by the controllee electronic apparatus, a second collection of user interface displays for controlling the auxiliary controllee electronic device, comprises sending to the remote control, by the controllee electronic apparatus, said second collection of user interface displays having a plurality of display states and associated display state transition rules.

6. The method of claim 4, wherein said sending to the remote control, by the controllee electronic apparatus, a second collection of user interface displays for controlling the auxiliary controllee electronic device, comprises sending to the remote control, by the controllee apparatus, said second collection of user interface displays having a plurality of display cells.

7. The method of claim 4, wherein said method further comprises
receiving by the controllee electronic apparatus, from said auxiliary controllee electronic device, specifications of substantive contents of said second collection of user interface displays; and
generating, by the controllee electronic apparatus, said second collection of user interface displays in accordance with said received specifications.

8. The method of claim 7, wherein said receiving of specifications of substantive contents of said second collection of user interface displays, by said controllee electronic apparatus, comprises receiving by the controllee electronic apparatus, from said auxiliary controllee electronic device, an XML based specification.

9. The method of claim 4, wherein said method further comprises
receiving, by the controllee electronic apparatus, second control commands from said remote control, the second control commands being resulted from said second collection of user interface displays being used by a user of said remote control; and
controlling operation of said auxiliary controllee electronic device, by said controllee electronic apparatus, in accordance with said received second control commands.

10. The method of claim 9, wherein said controlling of the operation of the auxiliary controllee electronic device, by the controllee electronic apparatus, comprises relaying, by the controllee electronic apparatus, the received second commands to the auxiliary controllee electronic device.

11. The method of claim 10, wherein said second control commands comprise control commands for controlling a plurality of operation characteristics of said auxiliary controllee electronic device, and said plurality of operation characteristics are selected from a group consisting of power on/off, play, fast forward, reverse, pause, stop, audio volume, picture brightness, and picture color.

12. A method of operation comprising:
providing sending to a primary controllee electronic device, by an auxiliary controllee electronic device, specifications for a collection of user interface displays having associated control commands for controlling the auxiliary controllee electronic device for the primary controllee electronic device to generate and send the collection of user interface displays having associated control commands to a remote control;
receiving by the auxiliary controllee electronic device, control commands originated from said remote control, the control commands being resulted from said collection of user interface displays having associated control commands being used by a user of said remote control; and
controlling operation of said auxiliary controllee electronic device, by said auxiliary controllee electronic device, in accordance with said received control commands.

13. The method of claim 12, wherein said sending to a primary controllee electronic device, by an auxiliary controllee electronic device, specifications for a collection of user interface displays having associated control commands for controlling the auxiliary controllee electronic device comprises, sending to the primary controllee electronic device, by the auxiliary controllee electronic device, specifications for said collection of user interface displays having a plurality of display states and associated display state transition rules.

14. The method of claim 12, wherein said sending to a primary controllee electronic device, by an auxiliary controllee electronic device, specifications for a collection of user interface displays having associated control commands, for controlling the auxiliary controllee electronic device comprises, sending specifications for said collection of user interface displays having a plurality of display cells.

15. The method of claim 12, wherein said sending to a primary controllee electronic device, by an auxiliary controllee electronic device, specifications for a collection of user interface displays having associated control commands for controlling the auxiliary controllee electronic device comprises, sending to the primary controllee electronic device, by the auxiliary controllee electronic device, an XML based specification, specifying substantive contents of the collection of user interface displays.

16. The method of claim 12, wherein said control commands comprise control commands for controlling a plurality of operation characteristics of said auxiliary controllee electronic device, and said plurality of operation characteristics are selected from a group consisting of power on/off, play, fast forward, reverse, pause, stop, audio volume, picture brightness, and picture color.

17. A method of operation comprising:
receiving by a remote control, from a primary controllee electronic device, a first collection of user interface displays having associated control commands for controlling the primary controllee electronic device, the first collection of user interface displays having a plurality of display states and associated display state transition rules;
facilitating usage of the first collection of user interface displays by a user, by the remote control, to control the primary controllee electronic device; and
sending first control commands to the primary controllee electronic device, by the remote control, to control the primary controllee electronic device, in response to said usage of the first collection of user interface displays.

18. The method of claim 17, wherein said receiving of a first collection of user interface displays having associated control commands for controlling the primary controllee electronic device, by the remote control, from the primary controllee electronic device, comprises receiving by the remote control, from the primary controllee electronic device, said first collection of user interface displays having a plurality of display cells.

19. The method of claim 17, wherein said first control commands comprise control commands for controlling a plurality of operation characteristics of said primary controllee electronic device, and said plurality of operation characteristics are selected from the group consisting of power on/off, channel selections, audio volume, picture brightness, and picture color.

20. The method of claim 17, wherein the method further comprises:
  receiving by the remote control, a second collection of user interface displays having associated control commands, from the primary controllee electronic device, for controlling an auxiliary controllee electronic device coupled to the primary controllee electronic device;
  facilitating usage of the second collection of user interface displays by the user, by the remote control, to remotely control the auxiliary controllee electronic device; and
  sending second control commands, either directly or indirectly, to the auxiliary controllee electronic device, by the remote control, to control the auxiliary controllee electronic device in response to said usage of the second collection of user interface displays.

21. The method of claim 20, wherein said receiving by the remote control, from a primary controllee electronic device, of said second collection of user interface displays for controlling the auxiliary controllee electronic device comprises, receiving by the remote control, from the primary controllee electronic device, said second collection of user interface displays having a plurality of display states and associated display state transition rules.

22. The method of claim 20, wherein said receiving by the remote control, from a primary controllee electronic device, of said second collection of user interface displays for controlling the auxiliary controllee electronic device comprises, receiving by the remote control, from the primary controllee electronic device, said second collection of user interface displays having a plurality of display cells.

23. The method of claim 20, wherein said second control commands comprise control commands for controlling a plurality of operation characteristics of said auxiliary controllee electronic device, and said plurality of operation characteristics are selected from a group consisting of power on/off, play, fast forward, reverse, pause, stop, audio volume, picture brightness, and picture color.

24. A controllee electronic apparatus comprising:
  first means to send to a remote control, from the controllee electronic apparatus, a first collection of user interface displays having associated control commands for controlling the controllee electronic apparatus, the first collection of user interface displays having a plurality of display states and associated display state transition rules, and to receive into the controllee apparatus first control commands from said remote control, the first control commands being resulted from said first collection of user interface displays being used by a user of said remote control; and
  second means to control operation of said controllee electronic apparatus in accordance with said received first control commands.

25. The apparatus of claim 24, wherein the apparatus further comprises a connection interface adapted to provide a connection selected from a group consisting of a wireless optical connection operated in accordance with a wireless optical communication protocol, a wireless electro-magnetic connection operated in accordance with a wireless communication protocol, and a wired electrical connection operated in accordance with a wired communication protocol, and said first means is adapted to send to the remote control, from the controllee electronic apparatus, the first collection of user interface displays through the connection selected from the group.

26. The apparatus of claim 25, wherein the apparatus further comprises a connection interface adapted to provide an infrared based optical connection, operated in accordance with an IrDA standard based wireless optical communication protocol, and said first means is adapted to send to the remote control, from the controllee electronic apparatus, the first collection of user interface displays through the infrared based optical connection.

27. The apparatus of claim 25, wherein the apparatus further comprises a connection interface adapted to provide a wireless electro-magnetic communication connection, operated in accordance with a selected one of a Bluetooth and an IEEE 802.11 standard based wireless communication protocol, and said first means is adapted to send to the remote control, from the controllee electronic apparatus, the first collection of user interface displays through the wireless electro-magnetic communication connection.

28. The apparatus of claim 25, wherein the apparatus further comprises a connection interface adapted to provide a wired electrical connection selected from a group consisting of a serial connection, a parallel connection, a USB connection, and an IEEE 1394 based connection, operated using a message based communication protocol, and said first means is adapted to send to the remote control, from the controllee electronic apparatus, the first collection of user interface displays through the wired electrical connection.

29. The apparatus of claim 24, wherein said first means is further adapted to send to said remote control, from the controllee electronic apparatus, a second collection of user interface displays having associated commands for controlling an auxiliary controllee electronic device coupled to said controllee electronic apparatus.

30. The apparatus of claim 29, further comprising:
  third means to receive into the controllee electronic apparatus, from said auxiliary controllee electronic device, specifications of substantive contents of said second collection of user interface displays; and
  fourth means to generate within the controllee electronic apparatus said second collection of user interface displays in accordance with said received specifications.

31. The apparatus of claim 30, wherein the apparatus further comprises a connection interface adapted to provide a connection selected from a group consisting of a wireless optical connection operated in accordance with a wireless optical communication protocol, a wireless electro-magnetic connection operated in accordance with a wireless communication protocol, and a wired electrical connection operated in accordance with a wired communication protocol, and said third means is adapted to receive the specifications, into the controllee electronic apparatus, from the auxiliary controllee electronic device, through the connection.

32. The apparatus of claim 31, wherein the apparatus further comprises a connection interface adapted to provide a video connection, operated in accordance with a message based communication protocol embedded within a video protocol, and said third means is adapted to receive the specifications, into the controllee electronic apparatus, from the auxiliary controllee electronic device, through the video connection.

33. The apparatus of claim 30, wherein
said first means is further adapted to receive second control commands into the controllee electronic apparatus from said remote control, the second control commands being resulted from said received second collection of user interface displays being used by said user of said remote control; and
said second and third means are further adapted to cooperate to control operation of said auxiliary controllee electronic device in accordance with said received second control commands.

34. The apparatus of claim 33, wherein said second and third means are adapted to cooperate to relay the received second commands from the controllee electronic apparatus to the auxiliary controllee electronic device.

35. The apparatus of claim 29, wherein said auxiliary controllee electronic device is a device selected from a group consisting of a videocassette recorder (VCR), a digital versatile disk (DVD) player, a home theatre audio control unit, and a video camera.

36. The apparatus of claim 24, wherein said controllee electronic apparatus is a TV.

37. The apparatus of claim 24, wherein said controllee electronic apparatus is a device selected from a group consisting of a set top box, a DVD player, and a VCR.

38. An auxiliary controllee electronic apparatus comprising:
first means adapted to send from the auxiliary controllee electronic apparatus specifications for a collection of user interface displays having associated control commands for controlling the auxiliary controllee electronic device to a primary controllee electronic device, for the primary controllee electronic device to generate and send the collection of user interface displays to a remote control;
second means adapted to receive control commands originated from said remote control into the auxiliary controllee electronic apparatus, the control commands being resulted from said received collection of user interface displays being used by a user of said remote control; and
third means adapted to control operation of said auxiliary controllee electronic device in accordance with said received control commands.

39. The apparatus of claim 38, wherein the apparatus further comprises a connection interface adapted to provide a connection selected from a group consisting of a wireless optical connection operated in accordance with a wireless optical communication protocol, a wireless electro-magnetic connection operated in accordance with a wireless communication protocol, and a wired electrical connection operated in accordance with a wired communication protocol, and said first means is adapted to send the specifications of its collection of user interface displays from the auxiliary controllee electronic apparatus, to the primary controllee electronic device through the connection.

40. The apparatus of claim 38, wherein the apparatus further comprises a connection interface adapted to provide a video connection, operated in accordance with a message based communication protocol embedded within a video protocol, and said first means is adapted to send the specifications for its collection of user interface displays from the auxiliary controllee electronic apparatus, to the primary controllee electronic device through the video connection.

41. The apparatus of claim 38, wherein said second means is adapted to receive into the auxiliary controllee electronic apparatus, the control commands, directly from the remote control.

42. The apparatus of claim 38, wherein said second means is adapted to receive the control commands into the auxiliary controllee electronic apparatus, indirectly, via said primary controllee electronic device.

43. The apparatus of claim 38, wherein said auxiliary controllee electronic apparatus is an apparatus selected from a group consisting of a videocassette recorder (VCR), a digital versatile disk (DVD) player, a home theatre audio control unit, and a video camera.

44. The apparatus of claim 38, wherein said primary controllee electronic device is a TV.

45. The apparatus of claim 38, wherein said primary controllee electronic device is a device selected from a group consisting of a set top box, a DVD player, and a VCR player.

46. A field extendable remote control apparatus comprising:
first means adapted to receive into the field extendable remote control apparatus, from a primary controllee electronic device, a first collection of user interface displays having associated control commands for controlling the primary controllee electronic device, the first collection of user interface displays having a plurality of display states and associated display state transition rules;
second means adapted to facilitate usage of the first collection of user interface displays by a user to control the primary controllee electronic device; and
third means adapted to send first control commands from the field extendible remote control apparatus to the primary controllee electronic device to control the primary controllee electronic device, in response to said usage of the first collection of user interface displays.

47. The apparatus of claim 46, wherein the apparatus further comprises a connection interface adapted to provide a connection selection from a group consisting of a wireless optical connection operated in accordance with a wireless optical communication protocol, a wireless electro-magnetic connection operated in accordance with a wireless communication protocol, and a wired electrical connection operated in accordance with a wired communication protocol, and said first means is adapted to receive into the apparatus the first collection of user interface displays, from the primary controllee electronic device, through the connection.

48. The apparatus of claim 46, wherein
said first means is further adapted to receive into the field extendible remote control apparatus a second collection of user interface displays having associated control commands, from the primary controllee electronic device, for controlling an auxiliary controllee electronic device coupled to the primary controllee electronic device;
said second means is further adapted to facilitate usage of the second collection of user interface displays by a user to remotely control the auxiliary controllee electronic device; and
said third means is further adapted to directly or indirectly send second control commands from the field extendible remote control apparatus, to the auxiliary controllee electronic device, to control the auxiliary controllee electronic device, in response to said usage of the second collection of user interface displays.

49. The apparatus of claim 48, wherein the apparatus further comprises a connection interface adapted to provide a connection selection from a group consisting of a wireless optical connection operated in accordance with a wireless optical communication protocol, a wireless electro-magnetic connection operated in accordance with a wireless communication protocol, and a wired electrical connection operated in accordance with a wired communication protocol, and said first means is adapted to receive into said field extendible remote control apparatus said second collection of user interface displays from the primary controllee electronic device, through the connection.

* * * * *